(12) United States Patent
Ahmad et al.

(10) Patent No.: US 11,599,836 B2
(45) Date of Patent: Mar. 7, 2023

(54) ASSIGNING A TUTOR TO A COHORT OF STUDENTS

(71) Applicant: FILO EDTECH INC., Lewes, DE (US)

(72) Inventors: Imbesat Ahmad, Patna (IN); Shadman Anwer, Delhi (IN); Rohit Kumar, Hisar (IN)

(73) Assignee: FILO EDTECH INC., Lewes, DE (US)

( * ) Notice: Subject to any disclaimer, the term of this patent is extended or adjusted under 35 U.S.C. 154(b) by 0 days.

(21) Appl. No.: 17/738,726

(22) Filed: May 6, 2022

(65) Prior Publication Data

US 2022/0261736 A1 Aug. 18, 2022

(30) Foreign Application Priority Data

Feb. 4, 2022 (IN) ............................. 202221006190

(51) Int. Cl.
*G06Q 10/06* (2012.01)
*G06Q 50/20* (2012.01)
*G06Q 10/0631* (2023.01)

(52) U.S. Cl.
CPC ............. *G06Q 10/063118* (2013.01); *G06Q 10/063112* (2013.01); *G06Q 50/20* (2013.01)

(58) Field of Classification Search
None
See application file for complete search history.

(56) References Cited

U.S. PATENT DOCUMENTS

| 2002/0013836 | A1* | 1/2002 | Friedman | G09B 5/00 705/7.35 |
| 2003/0113699 | A1* | 6/2003 | Johnson | G09B 7/00 434/323 |
| 2011/0276507 | A1* | 11/2011 | O'Malley | G06Q 10/00 705/321 |

(Continued)

FOREIGN PATENT DOCUMENTS

JP 2009530746 A * 8/2009

OTHER PUBLICATIONS

Koedinger et al. "New Potentials for Data-Driven Intelligent Tutoring System Development and Optimization" (2013) (http://pact.cs.cmu.edu/pubs/New%20potentials%20for%20ITS-source.pdf) (Year: 2013).*

*Primary Examiner* — Sujay Koneru
(74) *Attorney, Agent, or Firm* — Shumaker, Loop & Kendrick, LLP (57) ABSTRACT

A system and a method for assigning a tutor to a cohort of students. The system receives information from a tutor. The information comprises a name, academic details, preferred languages, a subject of interest, a topic of interest, an introductory video of the tutor, and available time slots. The system further automatically generates a question for a tutor in real-time based on the information. Furthermore, the system receives an answer to the question from the tutor in an answer format. Subsequently, the system generates an assessment report of the tutor. Further, the system computes a similarity index of the tutor with a profile of a cohort of the students. Finally, the system assigns the tutor to the cohort of the students based on the similarity index, feedback received from the cohort of the students, and the available time slots of the tutor.

9 Claims, 5 Drawing Sheets

(56) References Cited

U.S. PATENT DOCUMENTS

| | | | |
|---|---|---|---|
| 2014/0222806 A1* | 8/2014 | Carbonell | G06F 16/90335 707/732 |
| 2014/0350982 A1* | 11/2014 | Kapoor | G06Q 10/063112 705/7.14 |
| 2016/0048772 A1* | 2/2016 | Bruno | G06N 5/04 706/11 |
| 2016/0063655 A1* | 3/2016 | Piconi | G06Q 50/20 705/326 |
| 2016/0302034 A1* | 10/2016 | Sophinos | H04W 4/021 |
| 2017/0316080 A1* | 11/2017 | Brisebois | G06F 7/08 |
| 2018/0301048 A1* | 10/2018 | Almassizadeh | G06F 16/954 |
| 2018/0357653 A1* | 12/2018 | Andrade | G09B 7/00 |
| 2019/0051199 A1* | 2/2019 | Corbett | G09B 7/00 |
| 2020/0098073 A1* | 3/2020 | Le, Jr. | G09B 5/14 |
| 2020/0210506 A1* | 7/2020 | Schoenberg | G06F 16/2379 |
| 2020/0302397 A1* | 9/2020 | Mathiesen | G06Q 10/1053 |
| 2020/0379575 A1* | 12/2020 | Banerjee | G06F 17/18 |
| 2021/0043100 A1* | 2/2021 | Shaaban | G09B 5/12 |
| 2021/0134174 A1* | 5/2021 | Deshmukh | G09B 5/12 |
| 2021/0201690 A1* | 7/2021 | Keat | G09B 7/00 |
| 2022/0038350 A1* | 2/2022 | Ranganathan | G06F 40/35 |
| 2022/0044583 A1* | 2/2022 | Sherman | G06F 16/2379 |

* cited by examiner

«ASSIGNING A TUTOR TO A COHORT OF STUDENTS»

PRIORITY INFORMATION

The present application claims priority from Indian patent application no 202221006190 filed on 4 Feb. 2022.

TECHNICAL FIELD

The present subject matter described herein, in general, relates to a system and a method for assigning a tutor to a cohort of students.

BACKGROUND

The Covid-19 has made an enormous impact on the education system. The schools and the colleges are completely shut, and teachers are giving online lectures. Due to this, the online education domain has seen significant growth. With the advent of technology, a student logs in to an education platform and learn whatever he aspires to from any part of the world. Today, there are tons of education platforms available for helping students learn. There are thousands of courses already designed for a particular topic. The student only has to use his mobile or laptop and start learning online.

It is important to note that the education platform available today either offers a pre-recorded course for a topic or live lectures related to a topic. Further, it is difficult for the student to determine the best suitable teacher and the course from the pool of different courses and available teachers. Existing education platforms provide course ratings and tutor ratings to help the students to choose the right course and the teacher. However, the effectiveness of the online education is still under question.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for assigning a tutor to a cohort of students. This summary is not intended to identify essential features of the claimed subject matter nor is it intended for use in determining or limiting the scope of the claimed subject matter.

In one implementation, a method for assigning a tutor to a cohort of students is disclosed. Initially, information from a tutor may be received. The information may comprise a name, academic details, preferred languages, a subject of interest, a topic of interest, an introductory video of the tutor, and available time slots. Further, a question for a tutor may be automatically generated in real-time. The question may be generated based on the information provided by the tutor. Subsequently, the method may comprise receiving an answer to the question from the tutor in an answer format. The answer format may be one of a video-based, a voice-based, and a text-based. Further, an assessment report of the tutor may be generated. The assessment report may comprise a validity of the answer, a time taken to solve the question, a language proficiency of the tutor, the answer format, and a methodology used to solve the question. Subsequently, a similarity index of the tutor with a profile of a cohort of the students may be computed. The similarity index may be computed based on a comparison of the assessment report and the information received from the tutor with the profile of the cohort of the students. The similarity index may be computed using Deep Learning models and Reinforced Learning Algorithms. Finally, the tutor may be assigned to the cohort of the students based on the similarity index, a feedback received from the cohort of the students, and the available time slots of the tutor. In one aspect, the aforementioned method for assigning a tutor to a cohort of students may be performed by a processor using programmed instructions stored in a memory.

In another implementation, a non-transitory computer readable medium embodying a program executable in a computing device for assigning a tutor to a cohort of students is disclosed. The program may comprise a program code for receiving information from a tutor. The information may comprise a name, academic details, preferred languages, a subject of interest, a topic of interest, an introductory video of the tutor, and available time slots. Further, the program may comprise a program code for automatically generating a question for a tutor in real-time. The question may be generated based on the information provided by the tutor. Subsequently, the program may comprise a program code for receiving an answer to the question from the tutor in an answer format. The answer format may be one of a video-based, a voice-based, and a text-based. Further, the program may comprise a program code for generating an assessment report of the tutor. The assessment report may comprise a validity of the answer, a time taken to solve the question, a language proficiency of the tutor, the answer format, and a methodology used to solve the question. Subsequently, the program may comprise a program code for computing a similarity index of the tutor with a profile of a cohort of the students. The similarity index may be computed based on a comparison of the assessment report and the information received from the tutor with the profile of the cohort of the students. The similarity index may be computed using Deep Learning models and Reinforced Learning Algorithms. Finally, the program may comprise a program code for assigning the tutor to the cohort of the students based on the similarity index, a feedback received from the cohort of the students, and the available time slots of the tutor.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for assigning a tutor to a cohort of students disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "generating," "computing," "assigning," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for assigning a tutor to a cohort of students. The cohort of the students indicates a plurality of students with similar profiles. The goal of the invention is to onboard a tutor on an education platform (hereinafter as a platform). The platform helps students to connect with the tutor in real time. The system initially receives information from the tutor. The information may comprise a name, academic details, preferred languages, a subject of interest, a topic of interest, an introductory video of the tutor, and available time slots. Further, the system generates a question for the tutor based on the information. Furthermore, the system receives an answer to the question from the tutor. Subsequently, the system generates an assessment report comprising a validity of the answer, a time taken to solve the question, a language proficiency of the tutor, the answer format, and a methodology used to solve the question. It may be noted that the assessment report is generated in order to validate whether the tutor is apt to teach the students. Further, the system computes a similarity index of the tutor with a profile of a cohort of the students. It may be noted that the system does not onboard the tutor on the basis of the assessment report. The system computes the similarity index based on a comparison of the assessment report and the information received from the tutor with the profile of the cohort of the students. Further, when the tutor receives a positive feedback from the student the tutor is onboarded on the platform.

In an embodiment, the system assigns a student from a cohort of the student to the tutor. It may be noted that the tutor is assigned to the tutor when the student requires an answer to a question. In another embodiment, there may be one or more tutors already assigned to the cohort of the students. The current invention helps to determine which tutor is good for which cohort of the students. The current invention helps to select the tutor suitable for the cohort of the students.

Certain technical challenges exist for achieving the goal of assigning a tutor to a cohort of students. One technical challenge includes accurately generating a question for a tutor in real-time. The solutions presented by the embodiments disclosed herein to address the above challenge are machine-learning models for Natural Language Processing (NLP) Techniques. It may be noted that the question is generated based on the information provided by the tutor. The one or more machine learning models may comprise a Term Frequency-Inverse Document Frequency (TF-IDF), a support vector machine; a regression model; or a convolutional neural network. Another technical challenge includes accurately generating the assessment report of the tutor. The solution presented by the embodiments disclosed herein to address this challenge is a set of parameters used by the system to generate the assessment report. Traditional system generates the assessment report based on the correctness of the answer. It may be noted that the correctness of the answer should not be a sole criterion to assess the answer of the tutor. Thus, the present invention uses the set of parameters comprising a validity of the answer, a time taken to solve the question, a language proficiency of the tutor, the answer format, and a methodology used to solve the question to assess the answer more accurately. Another technical challenge includes computing a similarity index of the tutor with a profile of a cohort of the students. The solution presented by the embodiments disclosed herein to address this challenge is Deep Learning models, Reinforced Learning Algorithms such as Markov Decision Process and Artificial Intelligence Techniques. The similarity index is computed based on the comparison of the assessment report and the information received from the tutor with the profile of the cohort of the students. Another technical challenge includes assigning the tutor to the cohort of the students. The solution presented by the embodiments disclosed herein to address this challenge is based on the similarity index, a feedback received from the cohort of the students, and the available time slots of the tutor. It may be noted that the tutor is assigned the cohort of the students only when the tutor receives a positive feedback from the cohort of the students. In particular embodiment, when the tutor receives negative feedback the Deep Learning models may be trained based on the feedback. The Deep Learning models may continuously under training and learning to precisely compute the similarity index of the tutor with a profile of a cohort of the students.

A technical advantage of the embodiments may include efficiently adapting to various client systems and software with the ability to connect the tutor and the student. Another technical advantage of the embodiments may include improved understanding of the answer as the voice based, text based, and video based. Certain embodiments disclosed herein may provide none, some, or all of the above technical advantages. One or more other technical advantages may be readily apparent to one skilled in the art in view of the figures, descriptions, and claims of the present disclosure.

Figure 1:
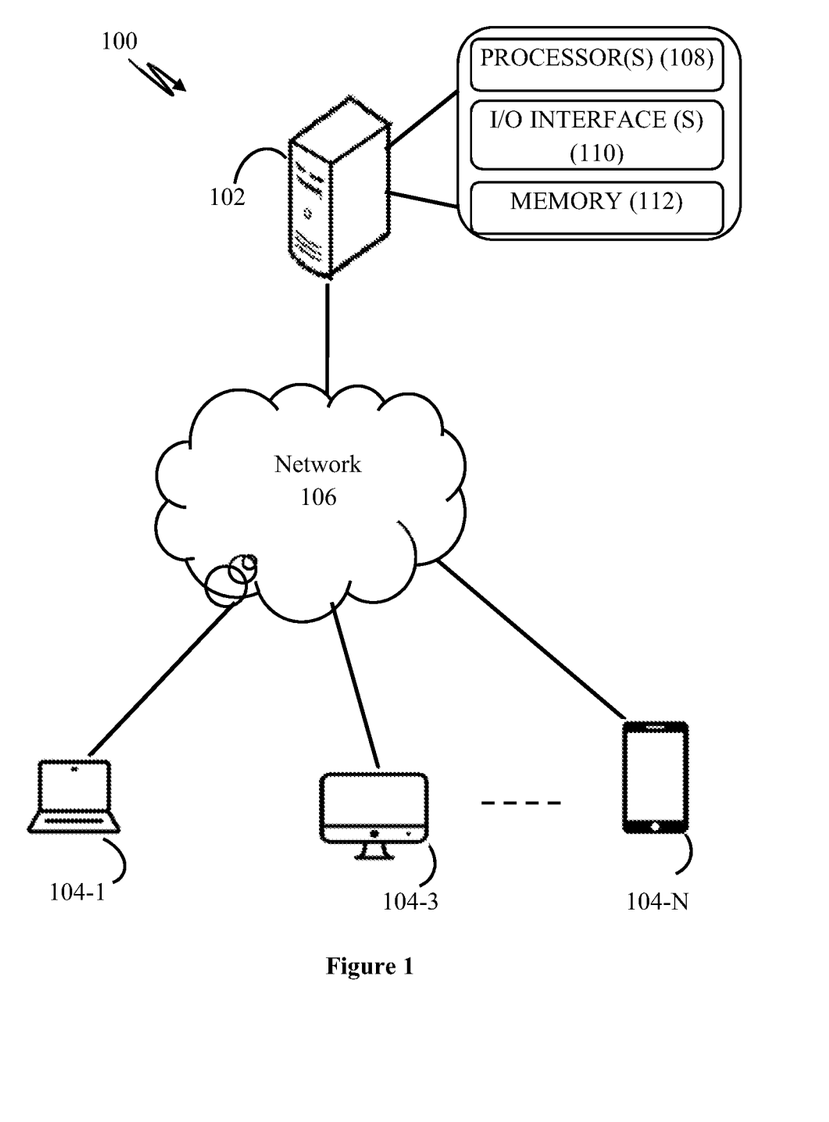
FIG. 1 illustrates a network implementation for assigning a tutor to a cohort of students, in accordance with an embodiment of the present subject matter.

Referring now to FIG. 1, a network implementation 100 of a system 102 for assigning a tutor to a cohort of students is disclosed. Initially, the system 102 receives information from a tutor. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives information from a tutor from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for assigning a tutor to a cohort of students. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for assigning a tutor to a cohort of students. The system 102 receives information from a tutor. The information may comprise a name, academic details, preferred languages, a subject of interest, a topic of interest, an introductory video of the tutor, and available time slots. In an embodiment, the system 102 also receives information comprising Permanent Account Number (PAN) details. The academic details may comprise previous colleges attended and previous schools attended by the tutor. The available time slot may be a time when the tutor is available for logging into a platform for answering a question asked by a student. In an example, the subject of interest may be Physics and the topic of interest may be Semiconductors.

In one embodiment, the system 102 may receive the information in a structured data format. It is to be noted that the system 102 may perform data computations on the structured data format. In one aspect, the system 102 may receive the information in an unstructured data format. Subsequently, the system 102 may perform data cleaning on the unstructured data format to obtain the structured data format. It must be noted that the system 102 may utilize predefined data cleaning algorithms to clean the unstructured data.

Further to receiving the information, the system 102 may automatically generate a question for a tutor in real-time. It may be noted that the question may be generated based on the information provided by the tutor. In an embodiment, the question may be generated from a predefined list of questions prestored in the system 102. It may be noted that the question may be at least one of a numerical, a conceptual and both. Consider an example, when the subject of interest of the tutor is Physics, and the topic of interest is Electrostatic, then the system 102 may generate a question related to Electrostatic from the predefined list of questions prestored in the system 102. In another embodiment, a difficulty level of the question may also be determined based upon the academic details of the tutor.

Further to generating the question, the system 102 may receive an answer to the question from the tutor in an answer format. The answer format may be one of a video-based, a voice-based, and a text-based. In the above example, the system 102 may receive an answer in a video mode. The system 102 may identify the language of the answer upon analysing the answer submitted. In one embodiment, the system 102 may convert the video-based answer to the text using speech to text conversion technique.

Further to receiving the answer, the system 102 may generate an assessment report of the tutor. The assessment report may comprise a validity of the answer, a time taken to solve the question, a language proficiency of the tutor, the answer format, and a methodology used to solve the question. It may be noted that that the validity of the answer may be determined by comparing the answer to a predefined answer. In one aspect, the validity of the answer may be determined based on a set of machine learning models. It may be noted that the set of machine learning models are trained in real time based on the answers received from the one or more tutors linked to the cohort of the student.

In another embodiment, a preferred language of the tutor may be determined based upon an analysis of the answer. The language proficiency of the tutor may be determined based on an accent of the tutor, vocabulary used by the tutor, fluency, and speaking speed of the tutor. In an embodiment, the methodology used by the tutor may be determined by comparing the answer with other answers submitted by one or more tutors having the similar topic of interest. In one aspect, the system 102 may determine the methodology used by comparing the rating of the tutor with the rating of the one or more tutors having the similar topic of interest. In another embodiment, the system also calculates an amount of detail present in the answer. In another embodiment, the system 102 may check whether the answer is a one-word answer or a detailed answer.

Further to generating the assessment report, the system 102 may compute a similarity index of the tutor with a profile of a cohort of the students. The similarity index may be computed based on a comparison of the assessment report and the information received from the tutor with the profile of the cohort of the students. The profile of the cohort of the students may comprise preferences for a language of the tutor, mode of answers, a time of study, subject of interest, and academic details. The similarity index may be computed using Deep Learning models and Reinforced Learning Algorithms such as Markov Decision Process. It may be noted that the cohort of the student indicates a plurality of students with similar profiles. In an embodiment, the system 102 may compare the similarity index of the tutor with a predefined threshold.

In an embodiment, the system 102 may create a tutor profile based on the assessment report and the information shared by the tutor. The tutor profile may comprise the subject of interest, the topic of interest, the preferred language, the preferred mode of the answer, type of questions answered. It may be noted that the tutor profile updates continuously based on answers submitted by the tutor on the platform.

Consider an example, the profile of the cohort of the students comprises students from $12^{th}$ Standard who wants to learn Electrostatics (topic) from an English-speaking tutor (language) in video mode during evening. Let us assume that the assessment report comprises preferred language of the tutor as English and preferred mode of the communication as Video. Further, the information of the tutor states that the subject of interest of the tutor is Physics and the topic of interest is Electrostatics. Furthermore, the available time of the tutor may be 5 pm to 8 pm in the evening. In the example, the system 102 may compute a similarity index of the tutor with a profile of a cohort of the students. In an embodiment, the system 102 may compare the similarity index of the tutor with a predefined threshold.

Further to computing a similarity index, the system 102 may assign the tutor to the cohort of the students based on the similarity index, a feedback received from the cohort of the students, and the available time slots of the tutor. The feedback from the cohort of the students may comprise a positive feedback and a negative feedback for the tutor. In an embodiment, the tutor is assigned to the cohort of the students only when the tutor gets a positive feedback. In another embodiment, the system 102 may assign the tutor to the cohort of the students when the similarity index of the tutor is above the predefined threshold.

It may be noted that the system 102 receives the feedback from the student when the tutor answers a question received from the student. In an embodiment, the system 102 may update the similarity index of the tutor based on the feedback. It may be noted that the system 102 keeps on assigning the one or more cohort of the students to the tutors until the tutor receive the positive feedback.

In another embodiment, when the tutor continuously receives negative feedback from the cohort of the students the system 102 stops assigning the cohort of the students to the tutor. In another embodiment, the system 102 blocks the tutor on the platform.

Consider an example, a tutor is assigned an "ABC cohort of the students." Further, the tutor receives a question from a student A of the ABC cohort of the students. In the example, the tutor may connect with the student A and may solve the question. Further, the student A may submit a feedback associated to the tutor on to the system. Furthermore, the system analyses the feedback. Let us assume that the feedback is a negative feedback. Further, the tutor receives a question from student B from the ABC cohort of the students. Let us assume that the student B also submits a negative feedback. The system 102 may predict that the ABC cohort of the students is not appropriate for the tutor.

Subsequently, the system 102 may assign a "PQR cohort of the students" to the tutor based on the similarity index, the feedback received from the cohort of the students, and the available time slots of the tutor. Further, let us assume that the tutor receives a question from student P from the PQR cohort of the students. Let us assume that the student P from the new cohort of the students submits a positive feedback for the tutor. When the system 102 receives a positive feedback from the student P the tutor is onboarded on the platform. It may be noted that the tutor is assigned to the PQR cohort of the students.

Consider an example, there are thousands of tutors on the platform. Further, there are thousands of cohorts of the students. It may be noted that the system 102 is able to assign an appropriate tutor for the cohort of the students based on the similarity index, a feedback received from the cohort of the students, and the available time slots of the tutor. It may be noted that the system 102 is able to assign the appropriate tutor for the student in real time by using deep learning algorithms, machine learning, and artificial intelligence techniques based on the assessment report of the tutor, the profile of a cohort of the students, and the information from the tutor. It may be noted that the system 102 may be continuously learning based on the feedback received from the students. It is to noted that the system 102 is performing huge data computations in real time over a distributed network of machines in real time thereby saving computational time and memory. In an embodiment, the system 102 may save memory and computational time by assigning the appropriate tutor to the cohort of the students.

Figure 2:
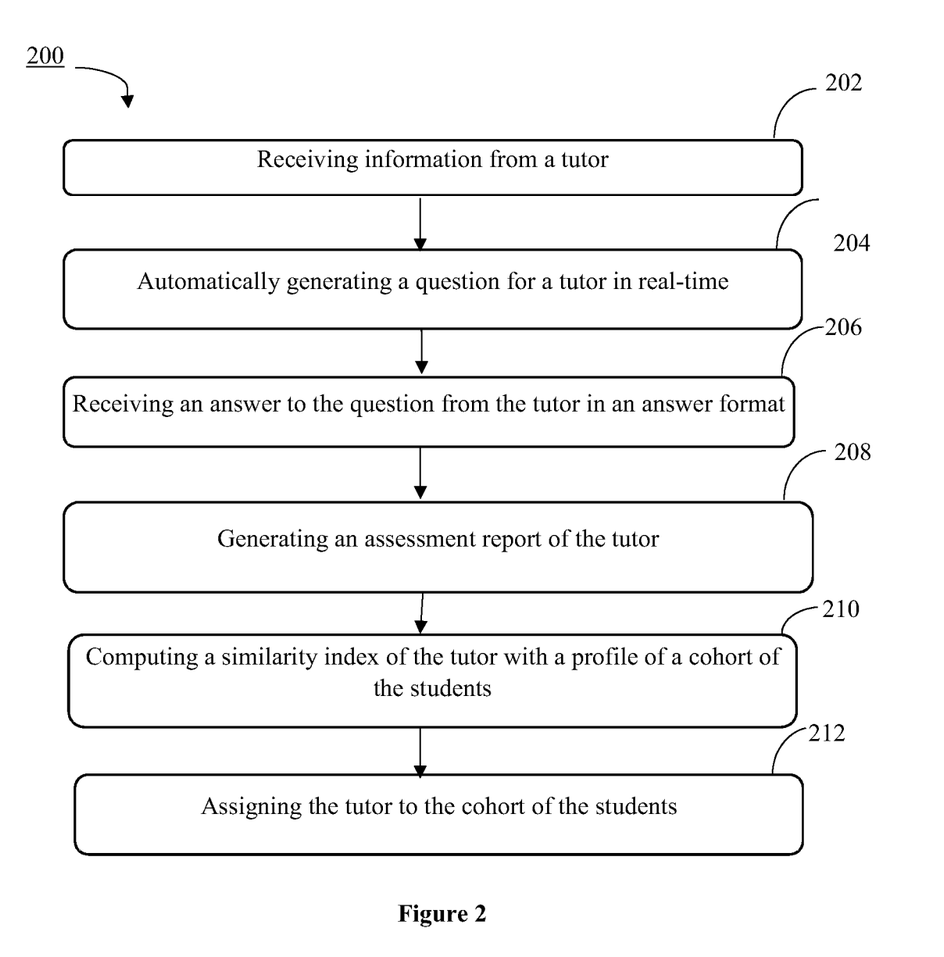
FIG. 2 illustrates a method for assigning a tutor to a cohort of students, in accordance with an embodiment of the present subject matter.

Referring now to FIG. 2, a method 200 for assigning a tutor to a cohort of students is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for assigning a tutor to a cohort of students. Additionally, individual blocks may be deleted from the method 200 without departing from the scope of the subject matter described herein. Furthermore, the method 200 for assigning a tutor to a cohort of students can be implemented in any suitable hardware, software, firmware, or combination thereof. However, for ease of explanation, in the embodiments described below, the method 200 may be considered to be implemented in the above-described system 102.

At block 202, information from a tutor may be received. The information may comprise a name, academic details, preferred languages, a subject of interest, a topic of interest, an introductory video of the tutor, and available time slots.

At block 204, a question for a tutor may be automatically generated in real-time. The question may be generated based on the information provided by the tutor.

At block 206, an answer to the question may be received from the tutor in an answer format. The answer format may be one of a video-based, a voice-based, and a text-based.

At block 208, an assessment report of the tutor may be generated. The assessment report may comprise a validity of the answer, a time taken to solve the question, a language proficiency of the tutor, the answer format, and a methodology used to solve the question.

At block 210, a similarity index of the tutor with a profile of a cohort of the students may be computed. The similarity index may be computed based on a comparison of the assessment report and the information received from the tutor with the profile of the cohort of the students. The similarity index may be computed using Deep Learning models and Reinforced Learning Algorithms.

At block 212, the tutor may be assigned to the cohort of the students based on the similarity index, a feedback received from the cohort of the students, and the available time slots of the tutor.

Figure 3:
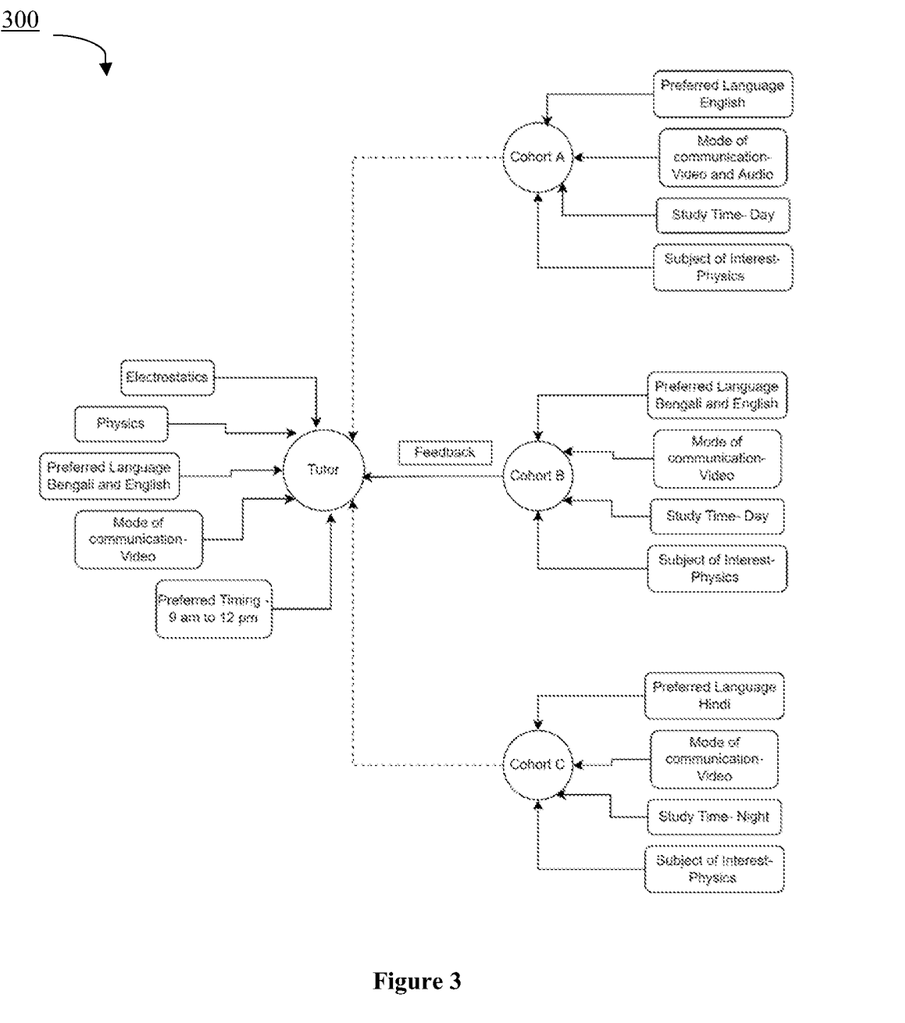
FIG. 3 illustrates an example for assigning a tutor to a cohort of students.

FIG. 3 illustrates an example of assigning a cohort of students to a tutor. In the example, let us assume that the system receives the information from the tutor. The information may comprise a name (not shown in the FIG. 3), academic details (not shown in the FIG. 3), preferred languages, a subject of interest, a topic of interest (not shown in the FIG. 3), an introductory video of the tutor (not shown in the FIG. 3), and available time slots of the tutor. Further, the system may receive an answer to the question generated by the system. Furthermore, the system may generate an assessment report of the tutor. In an embodiment, the system may create a tutor profile based on the information and the assessment report. Subsequently, the system may compute a similarity index of the tutor with one or more profiles of a cohort of the students (cohort A, cohort B, and cohort C). The similarity index may be computed based on Deep Learning models and Reinforced Learning Algorithms. In the example, let us assume that the similarity index between the tutor and the profile of the cohort A is 0.6. Further, the similarity index between the tutor and the profile of the cohort B is 0.8. Furthermore, the similarity index between the tutor and the profile of the cohort C is 0.4. The tutor may be assigned to the cohort B because the similarity index is higher when compared to the cohort A and the cohort C. Further, the system may receive a feedback related to the tutor from the students of the cohort B.

Figure 4:
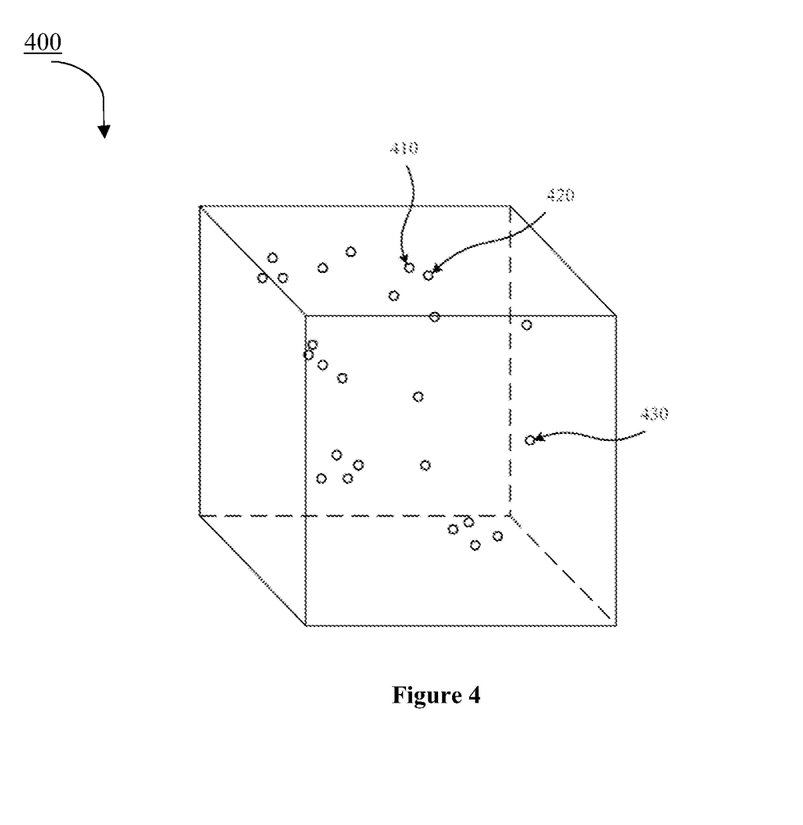
FIG. 4 illustrates an example view of an embedding space.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4.

As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object. As an example and not by way of limitation, an object comprising a video or an image may be mapped to a vector by using an algorithm to connect the student and the tutor in real time. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. Although this disclosure describes representing an n-gram or an object in a vector space in a particular manner, this disclosure contemplates representing an n-gram or an object in a vector space in any suitable manner.

In particular embodiments, the system 102 may calculate a similarity metric of vectors in vector space 400. A similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
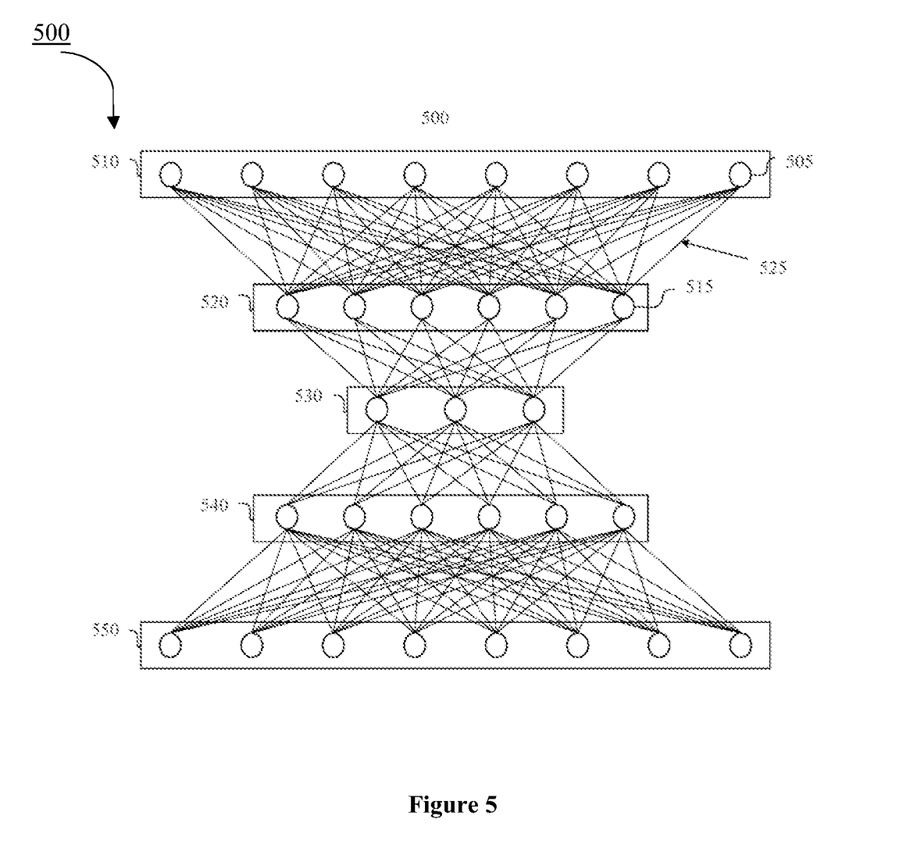
FIG. 5 illustrates an example artificial neural network.

FIG. 5 illustrates an example artificial neural network ("ANN") 500 of the deep learning algorithms. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method predict to find the cohort of the students for whom an individual is a good tutor.

Some embodiments of the system and the method enable the students to rate a tutor.

Some embodiments of the system and the method helps to match the tutor with the student efficiently.

Some embodiments of the system and the method enable onboarding of the tutor on the platform without any human intervention.

Some embodiments of the system and the method enable continuous learning of the model in order to better predict a cohort of the students for the tutor.

Some embodiments of the system and the method enable updating the similarity index of the tutor based on the feedback.

Although implementations for methods and system for assigning a tutor to a cohort of students have been described in language specific to structural features and/or methods, it is to be understood that the appended claims are not necessarily limited to the specific features or methods described. Rather, the specific features and methods are disclosed as examples of implementations for assigning a tutor to a cohort of students.

The invention claimed is:

1. A method implemented on an online education platform for onboarding a tutor, the method comprising:
- receiving, by a processor, information from a tutor comprising a name, academic details, preferred languages, a subject of interest, a topic of interest, an introductory video of the tutor, and available time slots;
- automatically generating, by the processor, a question for a tutor in real-time based on the information provided by the tutor, wherein the question is generated from a predefined list of questions using Machine Learning models, and wherein the predefined list of questions is prestored;
- receiving, by the processor, an answer to the question from the tutor in an answer format, wherein the answer format is one of a video-based, a voice-based, and a text-based;
- generating, by the processor, an assessment report of the tutor by analyzing the received answer, wherein the assessment report comprises a validity of the answer, a time taken to solve the question, a language proficiency of the tutor, the answer format, and a methodology used to solve the question;
- computing, by the processor, a similarity index of the tutor with one or more profiles of cohorts of students based on a comparison of the assessment report and the information received from the tutor with each of the one or more profiles, wherein the similarity index is computed using Deep Learning models and Reinforced Learning Algorithms, and wherein a cohort of students are a plurality of students with similar profiles;
- identifying, by the processor, at least one cohort of students from one or more cohort of students having highest similarity index;
- assigning, by the processor, the tutor to the identified cohort of students;
- receiving, by the processor, a question from one or more students of the identified cohort of students;
- connecting, by the processor, the tutor to the one or more students for answering the question received from the one or more students;
- receiving, by the processor, a feedback from the one or more students of the identified cohort of students on the answer provided by the tutor; and
- onboarding, by the processor, the tutor to the online education platform when the received feedback is a positive feedback.

2. The method as claimed in claim 1, wherein the profile of the cohort of students comprises a preferred language for tutoring, a preferred mode of answering, a preferred time for learning, subject of interest, and academic details.

3. The method as claimed in claim 1, wherein the feedback comprises the positive feedback and a negative feedback for the tutor.

4. The method as claimed in claim 1, comprises updating the similarity index of the tutor based on the feedback.

5. The method as claimed in claim 1, comprises determining preferred language of the tutor based upon the analysis of the answer.

6. The method as claimed in claim 1, wherein the answer is validated by comparing the answer to a predefined answer.

7. The method as claimed in claim 1, wherein the information received from the tutor is in structured data format.

8. A system implemented on an online education platform for onboarding a tutor, the system comprising:
- a memory; and
- a processor coupled to the memory, wherein the processor is configured to execute program instructions stored in the memory for:
  - receiving information from a tutor comprising a name, academic details, preferred languages, a subject of interest, a topic of interest, an introductory video of the tutor, and available time slots;
  - automatically generating a question for a tutor in real-time based on the information provided by the tutor, wherein the question is generated from a predefined list of questions using Machine Learning models, and wherein the predefined list of questions is prestored;
  - receiving an answer to the question from the tutor in an answer format, wherein the answer format is one of a video-based, a voice-based, and a text-based;
  - generating an assessment report of the tutor by analyzing the received answer, wherein the assessment report comprises a validity of the answer, a time taken to solve the question, a language proficiency of the tutor, the answer format, and a methodology used to solve the question;
  - computing a similarity index of the tutor with one or more profiles of cohorts of students based on a comparison of the assessment report and the information received from the tutor with the profile of the cohort of students, wherein the similarity index is computed using Deep Learning models and Reinforced Learning Algorithms, wherein the cohort of students indicates a plurality of students with similar profiles;
  - identifying at least one cohort of students from one or more cohort of students having highest similarity index;
  - assigning the tutor to the identified cohort of students;
  - receiving a question from one or more students of the identified cohort of students;
  - connecting the tutor to the one or more students for answering the question received from the one or more students;
  - receiving a feedback from the one or more students of the identified cohort of students on the answer provided by the tutor; and
  - onboarding the tutor to the online education platform when the received feedback is a positive feedback.

9. A non-transitory computer program product having embodied thereon a computer program for onboarding a tutor on an education platform, the computer program product storing instructions for:
- receiving information from a tutor comprising a name, academic details, preferred languages, a subject of interest, a topic of interest, an introductory video of the tutor, and available time slots;

automatically generating a question for a tutor in real-time based on the information provided by the tutor, wherein the question is generated from a predefined list of questions using Machine Learning models, and wherein the predefined list of questions is prestored;

receiving an answer to the question from the tutor in an answer format, wherein the answer format is one of a video-based, a voice-based, and a text-based;

generating an assessment report of the tutor by analyzing the received answer, wherein the assessment report comprises a validity of the answer, a time taken to solve the question, a language proficiency of the tutor, the answer format, and a methodology used to solve the question;

computing a similarity index of the tutor with one or more profiles of cohorts of students based on a comparison of the assessment report and the information received from the tutor with the profile of the cohort of students, wherein the similarity index is computed using Deep Learning models and Reinforced Learning Algorithms, wherein the cohort of students indicates a plurality of students with similar profiles;

identifying at least one cohort of students from one or more cohort of students having highest similarity index;

assigning the tutor to the identified cohort of students;

receiving a question from one or more students of the identified cohort of students;

connecting the tutor to the one or more students for answering the question received from the one or more students;

receiving a feedback from the one or more students of the identified cohort of students on the answer provided by the tutor; and onboarding the tutor to the online education platform when the received feedback is a positive feedback.

* * * * *